United States Patent [19]
Inoue et al.

[11] Patent Number: 5,435,504
[45] Date of Patent: Jul. 25, 1995

[54] AIRCRAFT

[75] Inventors: Kazuo Inoue; Michimasa Fujino, both of Tokyo, Japan; Yuva Otsuka, Starkville, Miss.; Tohru Fujihira, Saitama, Japan

[73] Assignee: Honda Giken Kogyo Kabushiki Kaisha, Tokyo, Japan

[21] Appl. No.: 48,691

[22] Filed: Apr. 16, 1993

[30] Foreign Application Priority Data

Mar. 9, 1993 [JP] Japan .................. 5-048265

[51] Int. Cl.6 ............................................ B64C 1/06
[52] U.S. Cl. ........................................ 244/13; 244/119
[58] Field of Search ............... 244/13, 15, 45 R, 55, 244/105, 106, 117 R, 119, 130, 133

[56] References Cited

U.S. PATENT DOCUMENTS

| | | | |
|---|---|---|---|
| 1,603,866 | 10/1926 | Rohrbach | 244/106 |
| 2,132,529 | 10/1938 | Fivner | 244/119 |
| 2,500,015 | 3/1950 | Tweney et al. | 244/119 |
| 2,604,280 | 7/1952 | Benoit | 244/119 |
| 3,286,470 | 11/1966 | Gerlaugh | 244/15 |
| 3,362,659 | 1/1968 | Razak | 244/15 |
| 3,455,523 | 7/1969 | Hertel | 244/130 |
| 3,834,654 | 9/1974 | Miranda . | |
| 4,116,405 | 9/1978 | Bacchi et al. . | |
| 4,155,522 | 5/1979 | Sealey | 244/102 R |
| 4,336,913 | 6/1982 | Hall . | |
| 4,415,132 | 11/1983 | Shirk . | |
| 4,417,708 | 11/1983 | Negri | 244/119 |
| 4,449,681 | 5/1984 | Gratzer et al. | 244/55 |
| 4,531,695 | 7/1985 | Swinfield | 244/119 |
| 4,562,546 | 12/1985 | Wykes et al. . | |
| 4,614,320 | 9/1986 | Rutan . | |
| 4,741,497 | 5/1988 | Fox | 244/117 R |
| 4,901,950 | 2/1990 | Judge | 244/119 |
| 5,024,399 | 6/1991 | Barquet et al. | 244/119 |
| 5,114,097 | 5/1992 | Williams | 244/117 R |
| 5,170,967 | 12/1992 | Hamamoto et al. | 244/119 |

*Primary Examiner*—Galen L. Barefoot
*Attorney, Agent, or Firm*—Lyon & Lyon

[57] ABSTRACT

An aircraft has an airframe including a fuselage having major structural members made of a composite material. The airframe also includes a sweepforward main wing mounted on top of the fuselage and a T or cruciform tail on the fuselage. The aircraft has no canard. The aircraft has a pair of main landing gear units attached to the fuselage below the main wing, the main landing gear units having short strut assemblies which allow the crew and passengers to get on and off the aircraft easily. The sweepforward main wing allows a wide and comfortable cabin space to be created in the fuselage.

10 Claims, 7 Drawing Sheets

AIRCRAFT

BACKGROUND OF THE INVENTION

1. Field of the Invention

The present invention relates to an aircraft having a sweepforward main wing with composite major structural members.

2. Description of the Relevant Art

Aircraft are limited to certain configurations to meet necessary aerodynamic requirements or due to mechanical strength limitations on structural members. For example, a main wing is generally swept back to reduce the wave resistance or drag, increase the drag critical Mach number, i.e., the speed at which the drag coefficient starts to increase sharply, or reduce fluctuations of the center of pressure, i.e., the point at which the line of action of a resultant aerodynamic force intersects the wing chord, due to a velocity difference. The sweepback angle also serves to locate the main wing aerodynamic center in an appropriate position.

Sweepforward wings are also employed to optimize the main wing aerodynamic center. Sweepforward wings are free of tip stall which would tend to occur with swept wings, do not allow the effectiveness of ailerons to be lowered at low speeds, and are capable of avoiding undesirable flight characteristics such as pitch-up due to tip stall caused by a sweepback angle. However, sweepforward wings are disadvantageous in that they are possibly subject to twists called torsional divergence in a high speed range.

For the reasons described above, present aircraft generally have a main wing swept backward.

To permit the crew and passengers to easily board and deplane an aircraft or to load the cargo on and unload the cargo from an aircraft with ease, it is effective to employ relatively short landing gear struts. If the landing gear is retractable, then shorter landing gear struts are advantageous in that any space for storing the landing gear in the fuselage may be smaller, allowing the fuselage to have a larger effective storage capacity. However, the shorter landing gear struts pose the following problems:

The shorter landing gear struts necessarily position the main wing and the engine nacelles closely to the runway surface. If an aircraft with shorter landing gear struts takes off or lands with an angle of bank, then the wing tips are liable to contact the runway surface. Accordingly, aircraft with shorter landing gear struts are necessarily required to have other wings than low wings. However, in the case where the main wing of an aircraft is not low wings, an attachment structure for attaching the main wing to the fuselage imposes limitations on the space in the cabin, making passengers uncomfortable, or results in aerodynamically undesirable conditions.

More specifically, the joint between a main wing and a fuselage passes through the cabin in a longitudinal position of the airframe which is based on the relative relationship of the aerodynamic center and the center of gravity of the fuselage to meet demands for static stability and balanced condition of the aircraft. If the wing-fuselage joint structure is disposed in the cabin, then the space capacity of the cabin is reduced. If the wing-fuselage joint structure is disposed on the fuselage above the cabin, then the drag coefficient of the airframe is increased, and the drag is increased due to an increase in the frontal area of the airframe.

The cabin is given a comfortable passenger space if the wing-fuselage joint is positioned in a rear portion of the cabin. However, it is necessary to optimize the aerodynamic center with the wing-fuselage joint thus positioned. Specifically, if the wing-fuselage joint is positioned in a rear portion of the cabin, then since the aerodynamic center is shifted backward with a sweepback angle, it is necessary to install a canard in the vicinity of the nose of the airframe for thereby shifting the aerodynamic center in the forward direction. If a canard is employed, however, certain structural disadvantages occur, i.e., the structural members of the nose on the front end of the fuselage must be reinforced, and the space for installing accessories in the nose is reduced. Furthermore, the canard induces undesirable flight characteristics. For example, the aircraft is caused to pitch down due to stall of the canard, and to pitch up when the main wing is in the wake of the canard.

SUMMARY OF THE INVENTION

It is an object of the present invention to provide an aircraft which allows the crew and passengers to be boarded and deplaned with ease, permits the cargo to be easily loaded and unloaded, has a comfortable cabin, and has a relatively low drag resistance and a relatively low airframe weight.

According to the present invention, there is provided an aircraft comprising an airframe having major structural members made of a composite material, the airframe including a sweepforward main wing and no canard.

The main wing comprises a high wing.

The airframe includes a fuselage comprising a surface layer structure and structural reinforcing members coupled to the surface layer structure, and landing gear units attached to the structural reinforcing members.

The structural reinforcing members include a keel extending longitudinally of the fuselage and a plurality of main frames extending substantially perpendicularly to the keel.

The keel and the main frames are bonded to each other.

Each of the main frames is of a hollow, substantially elliptical cross-sectional shape.

The main wing has a plurality of spars each attached to the main frames.

The fuselage includes a cabin section, the main wing and the fuselage being joined to each other behind the cabin section.

The main wing is attached to the fuselage in substantially the same position as the landing gear in the longitudinal direction of the fuselage.

The airframe further includes a T tail or a cruciform tail.

The sweepforward main wing is coupled to the fuselage in a position behind the cabin section. Since the major structural members including those of the main wing are made of a composite material that can be designed for anisotropy, it is possible to keep a required level of rigidity for the airframe and also have the main wing swept forwardly to an extent needed to balance the aircraft. The aircraft can thus be of a sweepforward main wing configuration with no canard. The aircraft is thus free of undesirable canard-induced aerodynamic difficulties, e.g., an abrupt pitch-down due to canard stall and a pitch-up which would otherwise result from the main wing positioned in the wake of the canard, and also gives wide visibility around the cabin section.

If the sweepforward angle of the sweepforward main wing is increased with respect to an aspect ratio, i.e., the ratio of the wing width to the average wing chord length, then the aircraft tends to stall from the wing roots, and to pitch up. However, the stall from the wing roots can be retarded by the high wing profile of the main wing. With the high main wing, since the wing has a positive setting angle, the trailing edge of the main wing enters the fuselage, narrowing an air flow passage in a rear region of the wing roots thereby to place a convergence effect on the air flow which is thus less liable to separate from the main wing.

The high wing configuration of the main wing is effective to provide good lateral controllability at low speed, which is a feature of the sweepforward angle, and also to prevent the wing roots from stalling without use of any leading edge droop and slat. A leading edge droop is disadvantageous in that it increases the drag while the aircraft is cruising. A slat does not increase the drag as it is retracted into the main wing while the aircraft is cruising, but poses a problem in that the joint between the slat and the main wing prevents a laminar flow of air from being developed along the main wing.

Inasmuch as the main wing and the landing gear units are attached to structural reinforcing members of the fuselage, any increase in the weight of the aircraft is minimized.

The horizontal tail is attached to the vertical tail in a T or cruciform tail profile and held at a suitable height for developing relatively small buffeting, used as a stall warning, due to the wake from the main wing roots at the time the main wing starts stalling. When the horizontal tail is positioned in the wake of the main wing, the downwash of the horizontal tail is reduced, and a pitch-down moment acts on the horizontal tail to suppress a pitch-up.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
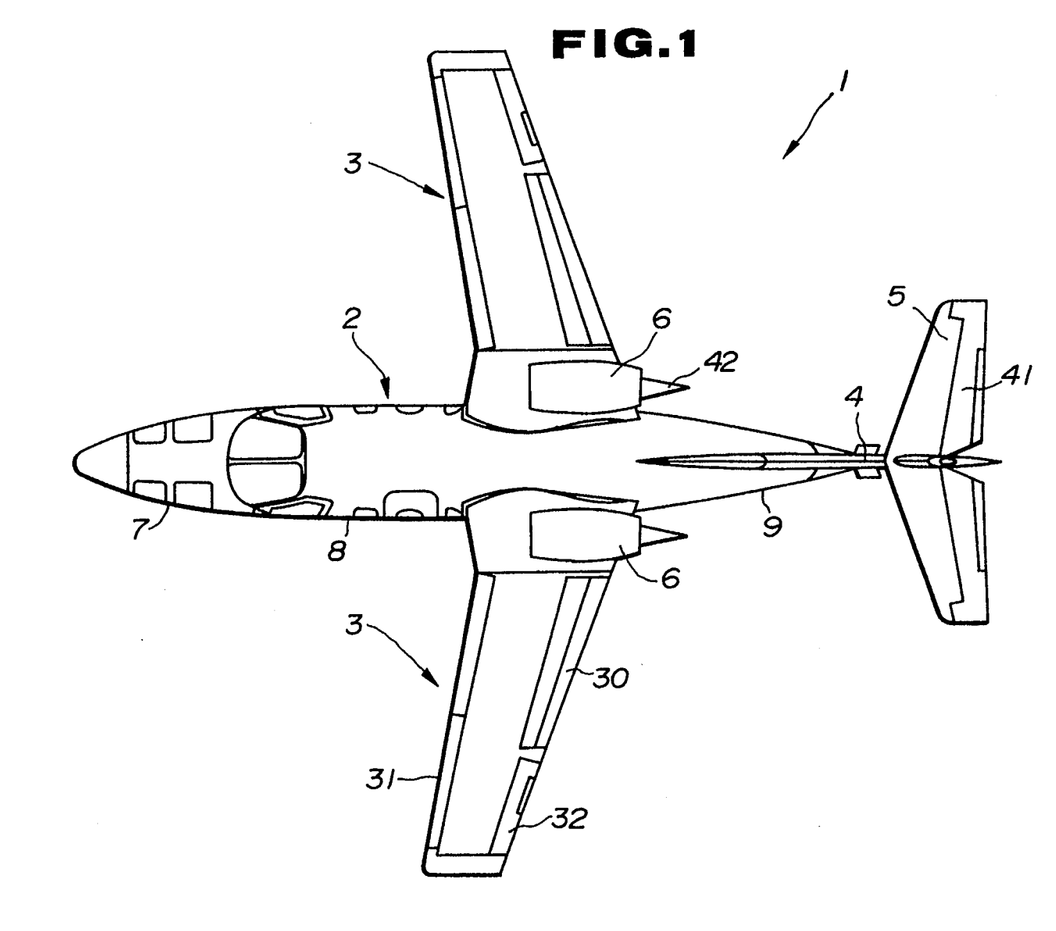
FIG. 1 is a plan view of an aircraft according to the present invention.
Figure 2:
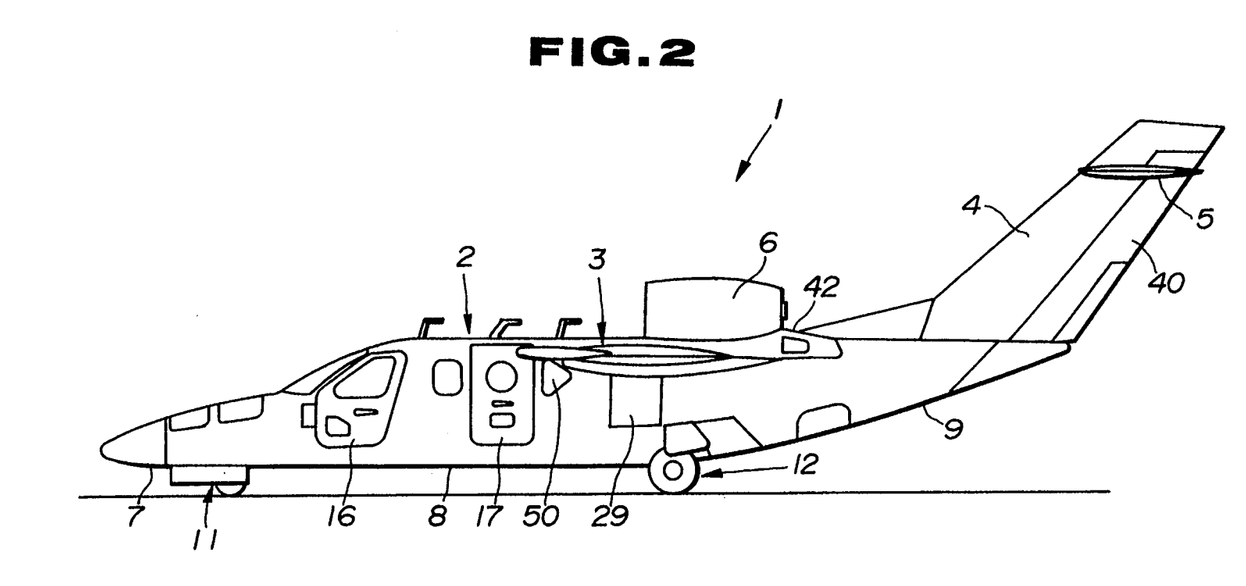
FIG. 2 is a side elevational view of the aircraft.
Figures 3, 3A:
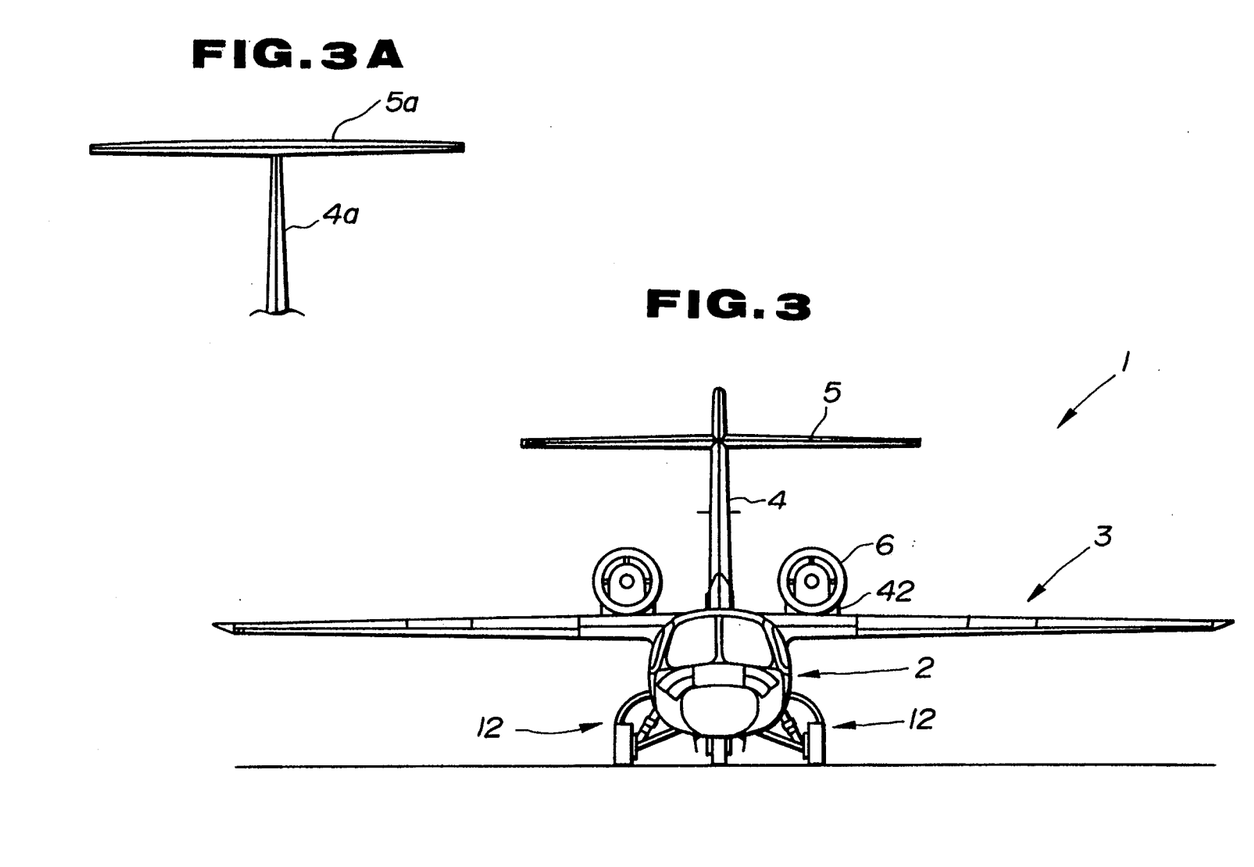
FIG. 3 is a front elevational view of the aircraft.
FIG. 3A is a fragmentary front elevational view of a tail assembly according to another embodiment of the present invention.

As shown in FIGS. 1 through 3, an aircraft 1 according to the present invention has a sweepforward main wing 3 attached to a fuselage 2 at a sweepforward angle Λ, and a tail assembly including a vertical tail 4 attached to the rear end of the fuselage 2 and a horizontal tail 5 attached to an upper portion of the vertical tail 4. The main wing 3 is in the form of a high wing mounted on top of the fuselage 2. The aircraft 1 has two turbofan engines 6 mounted on respective upper surfaces of left- and right-half wings of the main wing 3 near their wing roots joined to the fuselage 2.

The fuselage 2 comprises a nose section 7, a cabin section 8, and an aft section 9. A nose landing gear unit 11 is mounted on a lower region of the nose section 7, and a pair of main landing gear units 12 is mounted on a lower region of the aft section 9.

The main landing gear units 12 have relatively short strut assemblies for the reasons described below.

The ability of an aircraft to load and unload the cargo easily, and the case with which the crew and passengers get on and off the aircraft are improved by positioning the fuselage of the aircraft as closely to the ground as possible, thus shortening the distance between the ground and the floor in the fuselage. However, the airframe of the aircraft should not physically interfere with the ground when the aircraft lands. The minimum height of the aircraft from the ground, i.e., the distance from the ground to the lowest point of the airframe, is required to be equal to or greater than the sum of:

(1) the stroke of shock absorbers of the main landing gear units; and (2) the clearance between the ground and the airframe upon burst of tires of the main landing gear units.

The stroke of shock absorbers of the main landing gear units is governed by, among others, the maximum rate of descent of the aircraft upon landing and the limit load factor of the landing gear. Therefore, it is necessary to minimize the clearance between the ground and the airframe upon burst of tires of the main landing gear units.

According to the present invention, the clearance between the ground and the airframe upon burst of tires of the main landing gear units 12 is minimized, and the vertical distance between the lowest point of the fuselage 2 and the wheels of the main landing gear units 12 is substantially equal to the sum of (1) the stroke and (2) the clearance. The height from the ground level to the floor in the fuselage 2 is of a very low value of about 444 mm, allowing the crew and passengers to get on and off the aircraft without steps or other assistant devices.

The main wing 3, the fuselage 2, the engines 6, and other major structural members of the aircraft 1 with the short landing gear strut layout will be described below.

Figure 4:
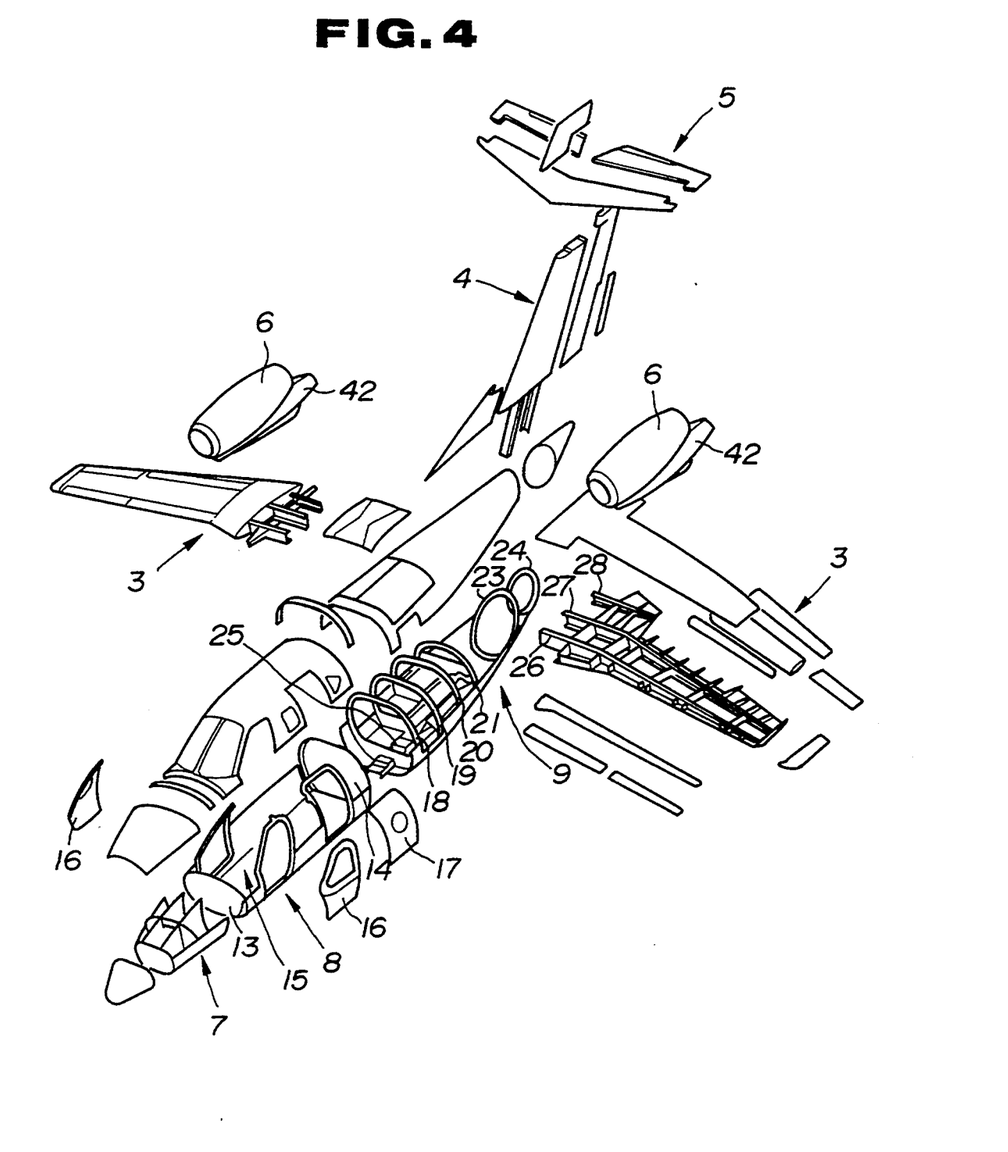
FIG. 4 is an exploded perspective view of major structural members of the aircraft.
Figure 5:
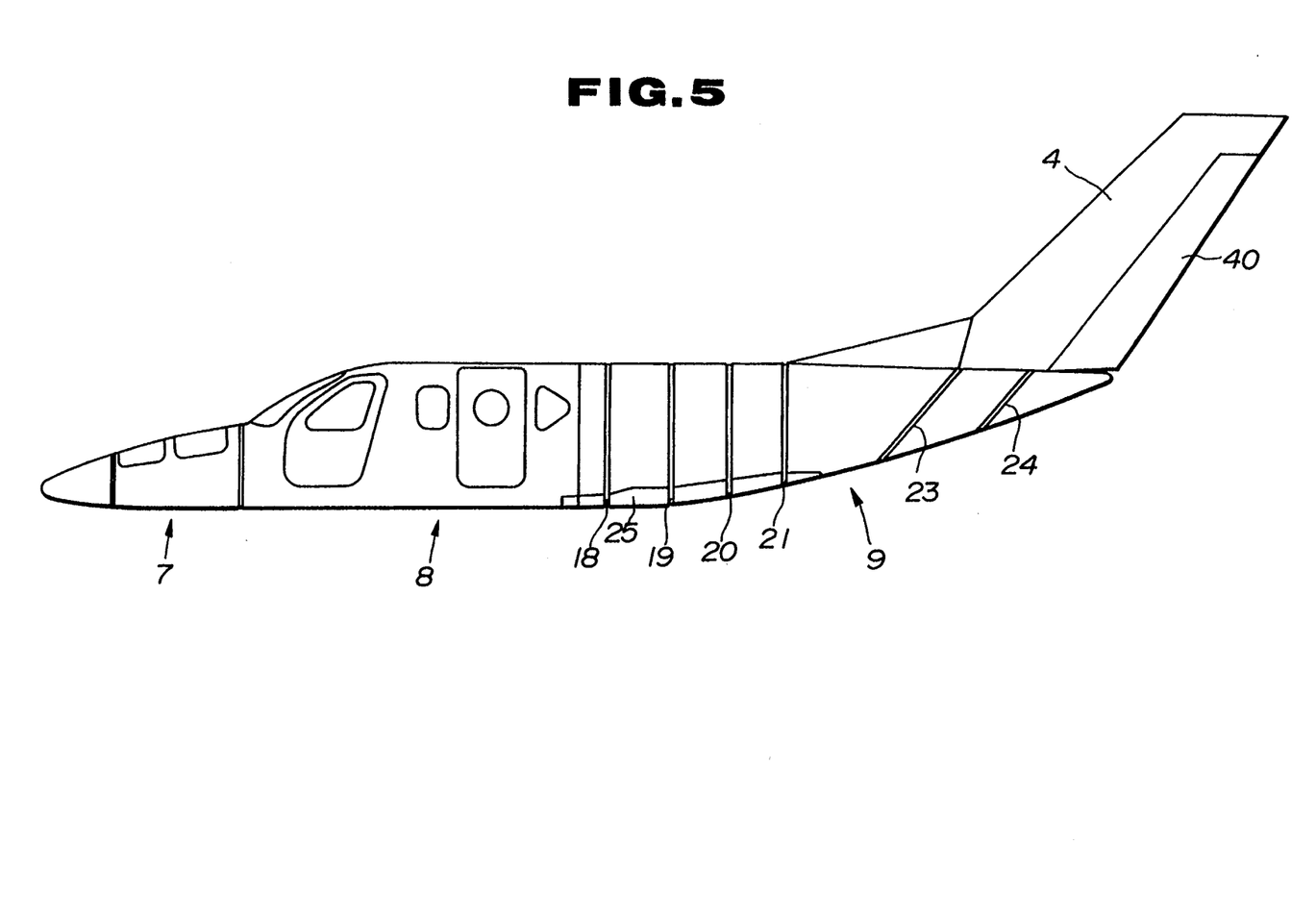
FIG. 5 is a side elevational view of a main structure of the aircraft.
Figure 6:
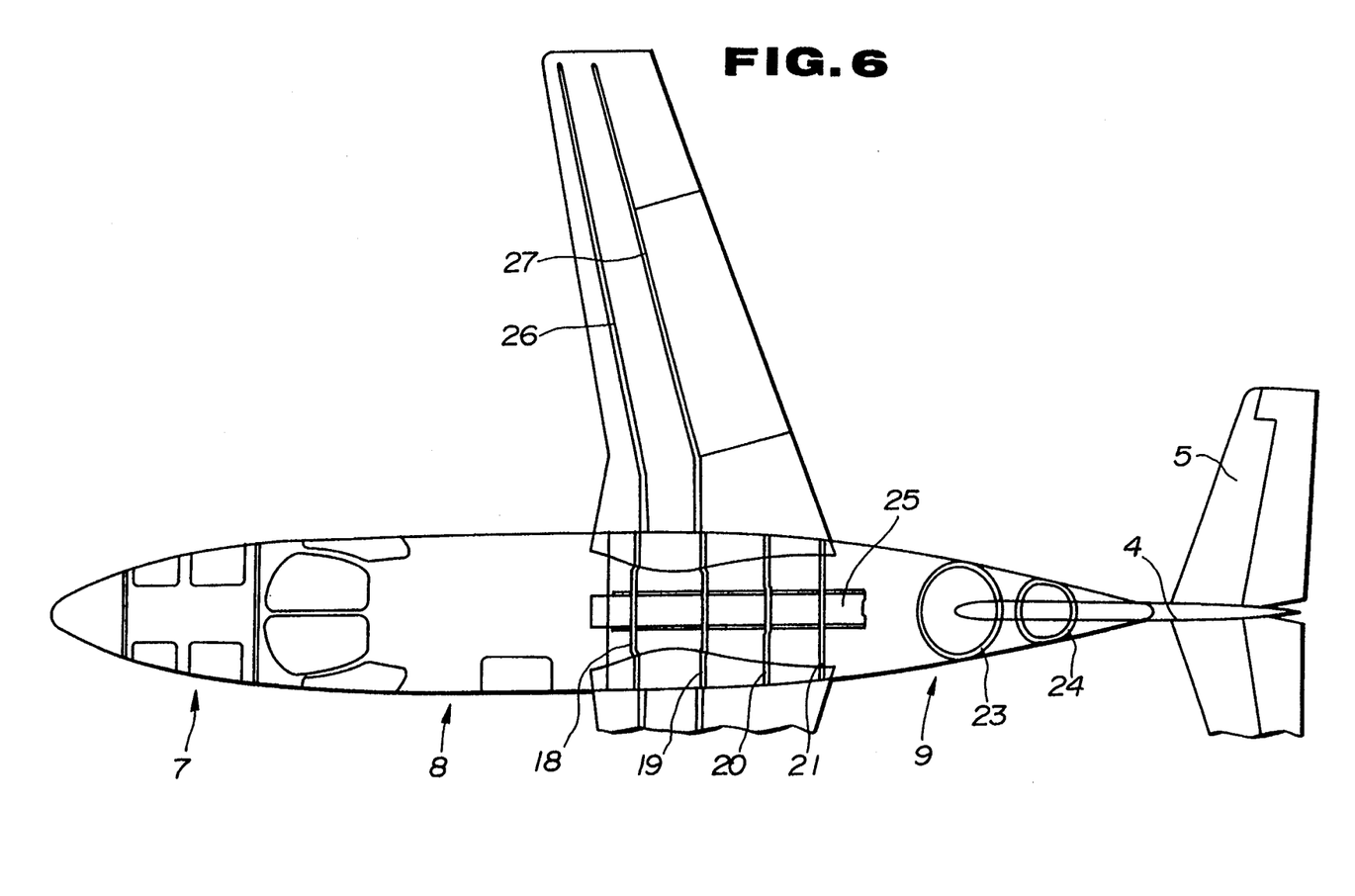
FIG. 6 is a fragmentary plan view of the main structure of the aircraft.

As described above, the fuselage 2 is divided into the nose section 7, the cabin section 8, and the aft section 9. The fuselage 2 is of a substantially elliptical cross-sectional shape. As shown in FIGS. 4, 5, and 6, the fuselage 2 is a purely monocoque structure composed of structural reinforcing members with no stringers. The airframe as a whole is made of a plastic-based composite material such as epoxy resin reinforced with carbon fibers, for example. The necessary rigidity of the fuselage 2 is achieved by frames of a composite material located at suitable positions and covered with a surface layer of a composite material. The surface layer is of a honeycomb structure composed of a core sandwiched by the composite material.

The cabin section 8 has a cabin chamber 15 defined by front and rear partitions 13, 14 and a surface layer. The cabin section 8 also has a pilot door 16 and a passenger door 17 for the crew and passengers to get on and off the aircraft 1 therethrough. The cabin section 8 also has windows, and some of the windows are triangular windows 50 (see FIG. 2) to give a good range of view through a limited window area.

As described above, the height which the crew and passengers have to climb up when boarding or deplaning the aircraft 1 is of a very small value of about 444 mm.

The aft section 9 is of a primary load-carrying structure where the main wing 3 and the main landing gear units 12 are supported. The aft section 9 has four main frames 18, 19, 20, 21 (see FIGS. 4 through 6) as fuselage stiffeners or reinforcing members in a front region thereof, and two oblique frames 23, 24 in a rear region thereof. Each of the main frames 18~21 is of a hollow, substantially elliptical cross-sectional shape. The aft section 9 also has a keel 25 positioned centrally on the bottom of the fuselage 2 and extending longitudinally thereof. The keel 25 is bonded to the main frames 18~21. The main wing 3 is attached to upper portions of the main frames 18~21. The main landing gear units 12 are attached to a lower portion of the main frame 19 and the keel 25. The aft section 9 has an internal space whose front portion serves as a cargo chamber, and a cargo door 29 (see FIG. 2) on one side thereof.

The main wing 3 is coupled to and supported by the upper portions of the main frames 18~21 in a cantilevered fashion. As shown in FIGS. 4 and 6, each of the left- and right-half wings of the main wing 3 has a main spar 26 located near its leading edge and extending to the wing tip, an intermediate spar 27 disposed behind the main spar 26 and extending to the wing tip, and a root spar 28 disposed behind the intermediate spar 27 near the trailing edge of the wing at the wing root. The main spar 26 and the intermediate spar 27 are coupled to the main frames 18, 19, respectively, and the root spar 28 is coupled to the main frame 20. These main, intermediate, and root spars 26, 27, 28 are made of a composite material for a high mechanical strength in desired directions. The main wing 3 also has a plurality of ribs extending perpendicularly to the main, intermediate, and root spars 26, 27, 28.

As described above, the main wing 3 has a sweepforward angle $\Lambda$, and the two turbofan engines 6 are mounted on the main wing 3 near their wing roots. As shown in FIG. 1, flaps 30 as high-lift devices are mounted on the trailing edges of the respective left- and right-half wings of the main wing 3 near the respective turbofan engines 6. Slats 31 are also mounted on the leading edges of the respective left- and right-half wings of the main wing 3. The flaps 30 and the slats 31 jointly serve to increase the maximum lift coefficient of the main wing 3, i.e., to improve the low-speed performance upon take-off and landing and shorten the take-off and landing distances. The flaps 30 comprise triple-slotted flaps for producing a large maximum lift. The triple-slotted flaps 30 which can extend backward to a large extent may be employed because the main wing 3 is a high wing though the main landing gear units 12 have relatively short strut assemblies.

Ailerons 32 are mounted on the respective trailing edges of the left- and right-half wings of the main wing 3 near the wing tips.

Figure 7:
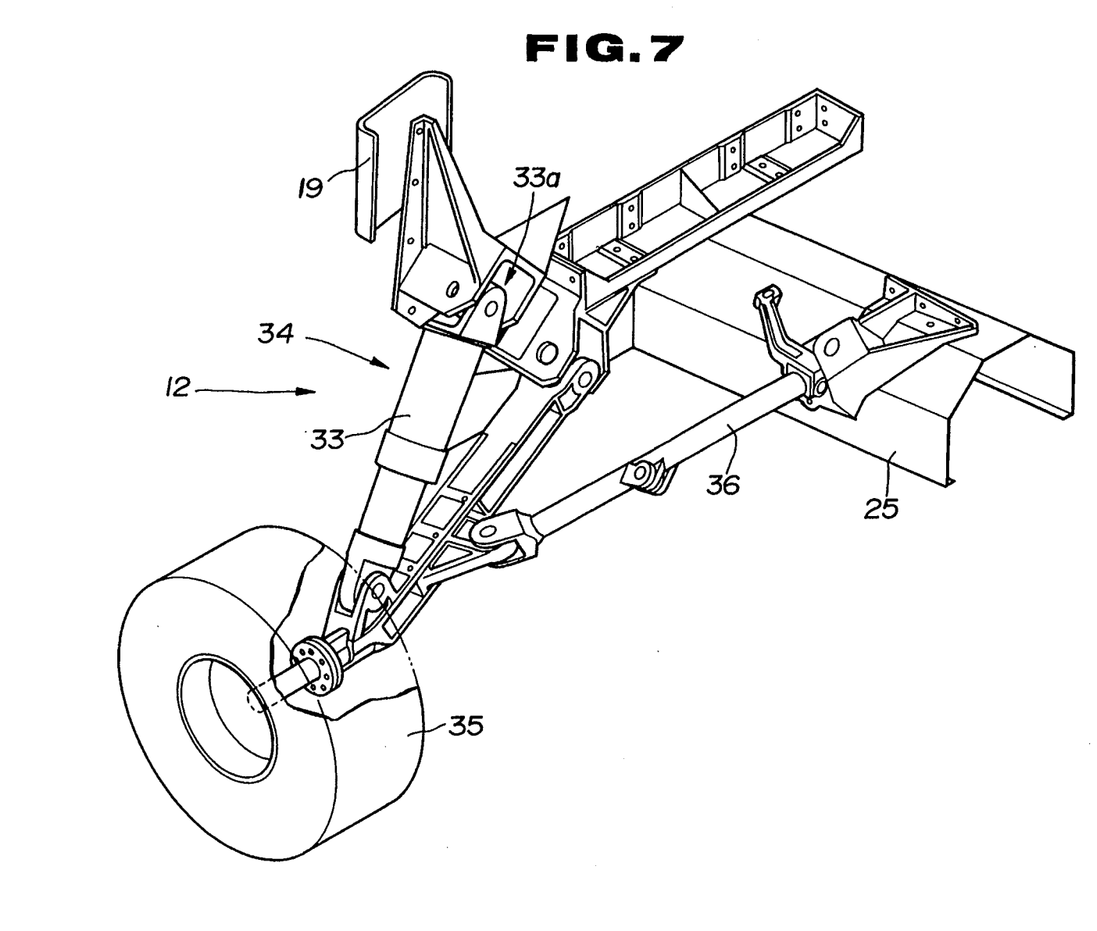
FIG. 7 is a perspective view of a main landing gear unit and its attachment of the aircraft.

An attachment structure for attaching each of the main landing gear units 12 to the fuselage 2 will be described below with reference to FIG. 7.

Each of the main landing gear units 12 comprises a strut assembly 34 coupled to the main frame 19 and having an oleo strut 33, and a wheel 35 rotatably mounted on the lower end of the strut assembly 34. The strut assembly 34 and the wheel 35 are retractable into the fuselage 2 by a retracting bar 36 connected to and supported by the keel 25.

To position the fuselage 2 as low as possible, a trunnion 33a on the upper end of the oleo strut 33 is disposed underneath laterally of the fuselage 2, allowing the floor of the fuselage 2 to be positioned relatively closely to ground when the aircraft 1 is landed.

Aircraft with high wings have a problem in that the tread of the landing gear is limited making the aircraft unstable when making turns on ground because the landing gear is retractable into the fuselage. According to the present invention, however, since the fuselage 2 is substantially elliptical in cross section, the tread can be as wide as possible and the fuselage 2 can be lowered as much as possible to lower the center of gravity thereof for improved maneuvering stability on ground.

Because the main frame 19 and the keel 25 are shared as strength members by the main wing 3 and the main landing gear units 12, stiffeners or reinforcements used on the aircraft 1 are simplified, thus increasing the effective space capacity in the fuselage 2 and reducing the weight of the fuselage 2.

The tail assembly will be described below.

The tail assembly comprises a relatively large vertical tail 4 attached to the aft section 9 of the fuselage 2 and a horizontal tail 5 attached to an upper portion of the vertical tail 4. The relatively large vertical tail 4 serves to increase the directional stability of the aircraft 1 during flight. More specifically, the relatively large vertical tail 4 is prevented from being adversely affected by the engines 6 mounted on the upper surface of the main wing 3, and hence is effective in compensating for a reduction in the directional stability which would otherwise be caused by the engines 6 mounted on the upper surface of the main wing 3. The horizontal tail 5 is attached to the upper portion of the vertical tail 4 in order to avoid the wake generated by the main wing 3 and the fuselage 2. Specifically, the tail assembly is in the form of a cruciform tail as shown in FIG. 3. However, the tail assembly may be in the form of a T tail as shown in FIG. 3A. In FIG. 3A, a horizontal tail 5a is mounted on top of a vertical tail 4a.

The illustrated arrangement of the vertical and horizontal tails 4, 5 is effective to increase the control effectiveness thereof. Specifically, the vertical tail 4 has a rudder 40 and the horizontal tail 5 has an elevator 41. The effectiveness of the rudder 40 and the elevator 41 is increased by the endplate effect, i.e., the blocking by the horizontal tail 5 of an air flow tending to escape upwardly of the fins.

The horizontal tail 5 may be positioned to detect a stall warning or prevent the aircraft 1 from pitching up.

The engines 6 are mounted on the upper surface of the main wing 3 near the wing roots by respective pylons 42, as shown in FIGS. 2 through 4. Since the engines 6 are disposed on top of the main wing 3, the position of the engines 6 is close to the center of gravity of the airframe, preventing the overall center of gravity from being shifted. Since propulsive forces are produced by the engines 6 closely to the longitudinal axis of the airframe, any yawing moment which is generated during flight when one of the engines 6 is disabled is minimized.

The short strut assemblies of the main landing gear units 12 allow the crew and passengers to get on and off the aircraft easily just like getting on and off automobiles. The sweepforward main wing 3 does not impose limitations on the space capacity of the cabin, permits good visibility through windows of the cabin, and hence allows the passengers to feel comfortable. Since the aircraft 1 is of a generally conventional design without any canard regardless of the sweepforward main wing 3, the aircraft 1 has good flight characteristics free from those flight characteristics that are inherent in the canard, e.g., an abrupt pitch-down and an abrupt pitch-up.

As described above, in order to employ main landing gear units with short strut assemblies, the aircraft according to the present invention has a sweepforward main wing, major structural members made of a composite material, and no canard. The aircraft thus allows the crew and passengers to get on and off easily and also allows the cargo to be loaded and unloaded easily. The aircraft also gives the passengers unobstructed visibility through cabin windows and a wide cabin space which makes the passengers feel highly comfortable.

Aeroelastic instability problems such as divergence which tend to occur with the sweepforward main wing are solved by using the composite material that can be designed for anisotropic properties. The center of gravity of the aircraft and the aerodynamic center thereof are optimized for balancing the aircraft in the pitching direction to give stable flight characteristics.

Although there have been described what are at presently considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An aircraft, comprising:
   an airframe having major structural members that includes a fuselage comprising a surface layer structure and structural reinforcing members coupled to said surface layer structure, and landing gear units attached to said structural reinforcing members, wherein said structural reinforcing members are made of a composite material;
   said airframe including a sweepforward main wing and no canard, wherein said main wing comprises a high wing;
   said structural reinforcing members including a keel extending longitudinally of said fuselage and a plurality of main frames extending substantially perpendicularly to said keel, and wherein said keel and said main frames are bonded to each other;
   wherein said fuselage comprises a monocoque structure including a nose section, a cabin section, and an aft section, wherein said plurality of main frames extending substantially perpendicularly to said keel comprises four frames in a front region of said aft section, and wherein said structural reinforcing members further comprise two oblique frames in a rear region of said aft section, wherein said oblique frames are bonded to said keel.

2. An aircraft according to claim 1, wherein each of said main frames is of a hollow, substantially elliptical cross-sectional shape.

3. An aircraft according to claim 1, wherein said main wing has a plurality of spars each attached to an upper portion of said main frames extending substantially perpendicularly to said keel.

4. An aircraft according to claim 1, wherein said main wing and said fuselage are joined to each other behind said cabin section.

5. An aircraft according to claim 1, wherein said main wing is attached to said fuselage in substantially the same position as said landing gear units in the longitudinal direction of said fuselage.

6. An aircraft according to claim 1, wherein said airframe further includes a T tail.

7. An aircraft according to claim 1, wherein said airframe further includes a cruciform tail.

8. An aircraft according to claim 1, wherein said surface layer structure comprises a honeycomb structure.

9. An aircraft according to claim 1, wherein said landing gear units comprise struts having relatively short strut assemblies, and wherein said landing gear units are attached to a lower portion of one of said plurality of main frames extending substantially perpendicularly to said keel.

10. An aircraft according to claim 1, wherein each of said plurality of main frames extending substantially perpendicularly to said keel are located in a front region of an aft section of said fuselage, and said sweepforward main wing comprises a left half wing and a right half wing, each of said left and right half wings comprising three wing spars, wherein each of said wing spars is attached in a cantilevered fashion to an upper portion of one of said plurality of main frames extending substantially perpendicularly to said keel.

* * * * *

UNITED STATES PATENT AND TRADEMARK OFFICE
CERTIFICATE OF CORRECTION

PATENT NO. : 5,435,504
DATED : July 25, 1995
INVENTOR(S) : KAZUO INOUE, MICHIMASA FUJINO, YUYA OHTSUKA, TOHRU FUJIHARA It is certified that error appears in the above-indentified patent and that said Letters Patent is hereby corrected as shown below:

On the title page, items [19] and [75] change Inventor's name;

"Yuva" to -- Yuya --.

Signed and Sealed this

Twenty-eighth Day of November 1995

Attest:

BRUCE LEHMAN

Attesting Officer       Commissioner of Patents and Trademarks